April 15, 1958    ALBRECHT-WOLF MANTZEL    2,830,636
VEHICLE WHEEL
Filed July 12, 1954    2 Sheets-Sheet 2
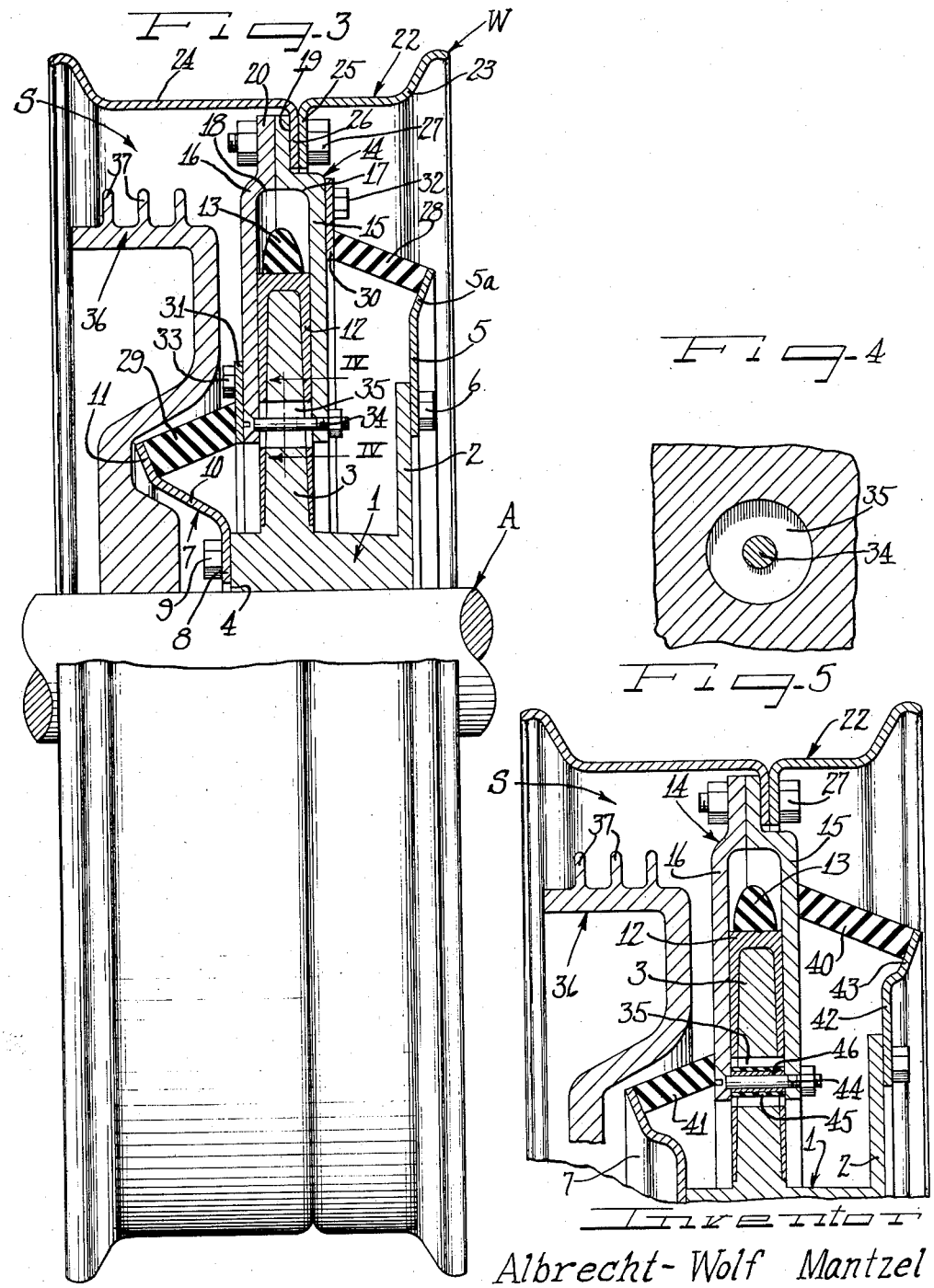
Inventor
Albrecht-Wolf Mantzel

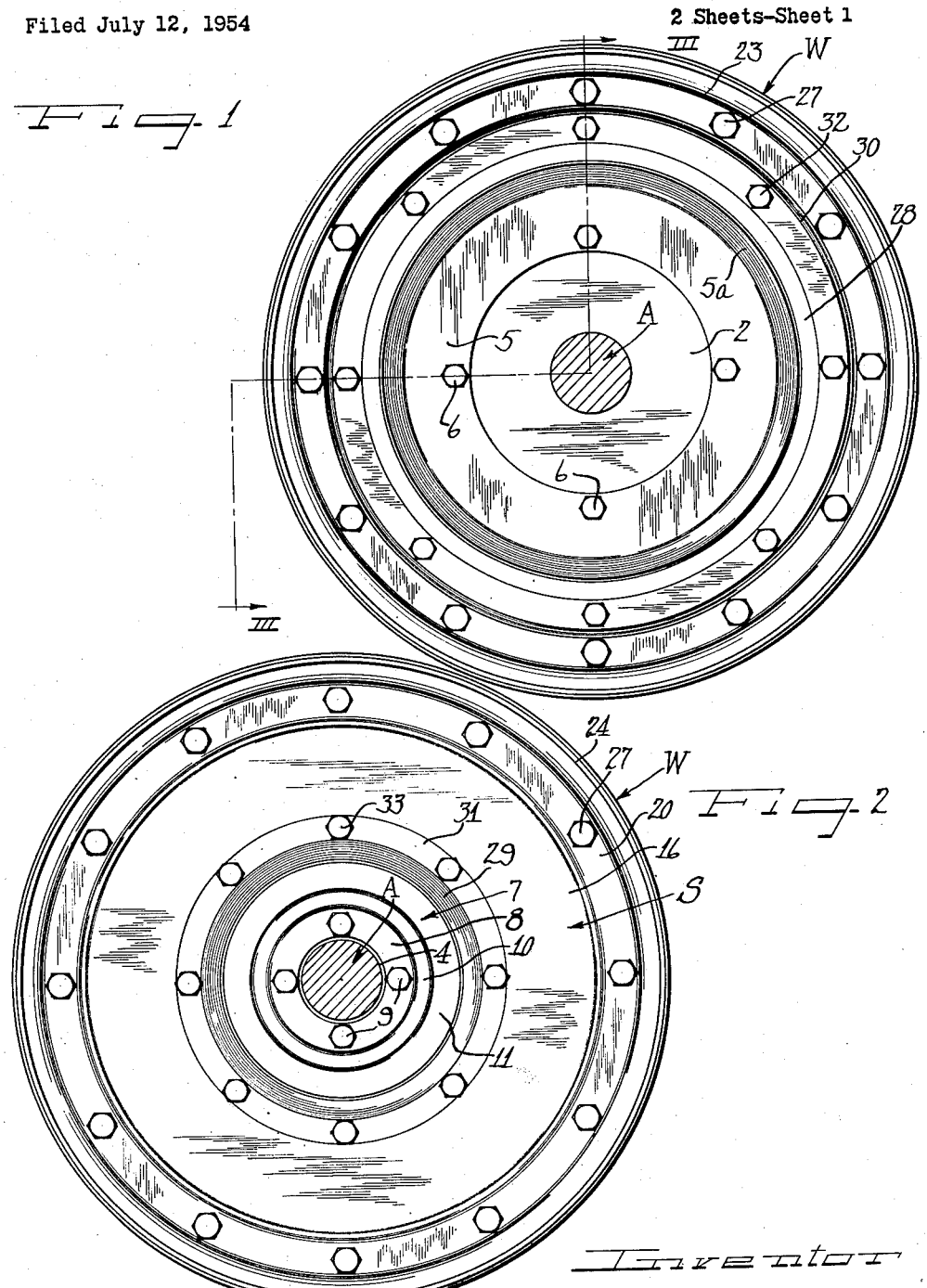

2,830,636

VEHICLE WHEEL

Albrecht-Wolf Mantzel, Stuttgart, Mohringen, Germany, assignor, by mesne assignments, to Rand-Goetze Corporation, Cleveland, Ohio, a corporation of Ohio Application July 12, 1954, Serial No. 442,671

Claims priority, application Germany July 13, 1953

5 Claims. (Cl. 152—49)

This invention relates to a resilient vehicle wheel accommodating a large brake drum on one side thereof. Specifically, this invention deals with a wheel having rubber rings connecting the hub and rim of the wheel on opposite sides of a sliding guide wherein one of the rubber rings is of relatively small diameter to provide a space within the rim accommodating a sufficiently large brake drum to be air-cooled.

In vehicle wheels having hubs sprung by annular elastic springing members between the hub and the rim at both sides of a sliding guide, there is only a limited space for mounting a sufficiently large brake drum to be cooled by air currents in driving.

The present invention now makes possible the mounting of a relatively large brake drum surrounded by the vehicle rim in overlying relation to one of the annular springing elements.

According to this invention, a small diameter elastic rubber-like ring or band is provided on one side of the wheel guide which maintains the wheel and hub in lateral alignment. The other side of the wheel has a large diameter elastic rubber-like ring. The rings extend generally laterally outward from rim-carried components to hub-carried components and are vulcanized at their extremities to these components. The small diameter ring is preferably thicker than the large diameter ring to balance stresses. It has been found that if the rubber rings have different diameters but equal thickness or radial width, the relationship of circumferential forces equals the square of the relation of the diameters and the torque relation equals the third power of the relation of diameters. On the other hand when the rubber rings of different diameter have radial widths in inverse proportion to the diameters, the relation of the circumferential forces is equal to the relation of the diameters while the relation of the torque moments only equals the square of the relation of the diameters. Of course, unequal lateral stresses tending to tilt the rim parts relative to the hub parts to thereby bind the guide, should be avoided.

Other variations for distributing the load on the rubber rings include variations in the axial length of the rings, utilization of rubber of different hardness of springing qualities, and the like.

It is then an object of this invention to provide a rubber sprung wheel accommodating a large diameter brake drum.

Another object of this invention is to provide a rubber wheel of the type having rubber rings or bands between the wheel hub and the wheel rim on both sides of the sliding guide, wherein the inner or rear rubber ring on the wheel has a materially lesser diameter than the outer or front rubber ring on the wheel to provide between the inner or rear rubber ring and the hub and the rim of the wheel a sufficiently large space to accommodate a brake drum adapted to be air cooled.

A still further object of this invention is to provide a spring wheel having elastic members between the hub and rim portions thereof wherein the elastic member on one side of the wheel is smaller and thicker than the elastic member on the other side of the wheel to provide a space under the rim accommodating a large diameter brake drum or other parts.

A still further object of this invention is to provide a resilient laterally stabilized wheel having a small thick rubber ring on one side thereof and a large thinner rubber ring on the other side thereof connecting the hub and rim components of the wheel and providing around the small rubber ring a sufficiently large space to accommodate an air-cooled brake drum.

A specific object of the invention is to provide in a spring wheel having laterally extending rubber rings on opposite sides of a guide between the hub and rim of the wheel wherein the ring on one side of the guide is of less diameter and of greater thickness than the ring on the other side of the guide and wherein the thickness of the rings vary in inverse proportion to the diameters of the rings so as to balance circumferential stresses on both sides of the guide.

Other and further objects of the invention will be apparent to those skilled in the art from the following detailed description of the annexed sheets of drawings which, by way of a preferred example only, illustrate one embodiment of the invention.

On the drawings:

Figure 1 is a front elevational view of the spring wheel.

Figure 2 is a rear elevational view of the wheel with parts omitted.

Figure 3 is an enlarged partial sectional view taken along the line III—III of Figure 1.

Figure 4 is an enlarged detail view taken along the line IV—IV of Figure 3.

Figure 5 is a fragmentary sectional view of the modified spring wheel of this invention.

As shown on the drawings:

The wheel W has its own axle part A and includes a hub 1 with a radially extending flange 2 on the front or outer face thereof and a larger diameter and thicker flange 3 spaced rearwardly from the flange 2 and projecting radially therebeyond. The hub 1 extends axially beyond the flange 3 to a back or rear face 4.

A metal ring 5 is secured to the outer peripheral margin of the flange 2 by means of circumferentially spaced bolts 6 and this ring 5 has an outturned or beveled outer peripheral portion 5a.

A dished metal ring 7 has a radially extending inner peripheral margin 8 secured to the rear face 4 of the hub 1 by peripherally spaced bolts 9. The ring 7 is dished outwardly from the inner peripheral portion 8 along an inclined intermediate portion 10 and an inclined outer peripheral flange 11 on the outer end of this portion 10 is provided rearwardly and radially outward of the hub.

The flange 3 is covered with a coating or layer 12 of material having good sliding characteristics such as a lubricant impregnated metal, a plastic material, or the like.

A resilient ring 13 surrounds the coated or covered flange 3 to act as a stop or bumper as will hereinafter be more fully described.

A hollow guide 14 straddles the covered flange 3 and is composed of a pair of metal disks 15 and 16 with inturned peripheral flanges 17 and 18 having outturned radial flanges 19 and 20 in mated face-to-face engagement.

A rim assembly 22 surrounds the guide 14 and includes two components 23 and 24 each with inturned radial flanges 25 and 26 respectively, held in face-to-face engagement with each other and on the flanges 19 and 20 of the guide 14 by a ring of bolts 27 spaced peripherally around the rim. The rim assembly 22 is thus detachably connected to the guide to facilitate a change of the rim.

A pair of frusto-conical elastic rings or sleeves 28 and 29 connect the hub and rim portions of the wheel. These rings or sleeves are composed of rubber or synthetic elastic rubber-like material and are vulcanized at first anchorages to the flanges 5a and 11 respectively of the hub-carried metal rings 5 and 7 at their outer ends and at second anchorages to flat metal rings 30 and 31 respectively, at their inner ends. The ring 30 is secured to the disk 15 of the guide 14 by peripherally spaced bolts 32 adjacent the marginal flange 17 of the disk. The ring 31 is secured to the disk 16 of the guide assembly 14 by a ring of bolts 33 adjacent inner marginal periphery of the disk 16.

As shown, the rubber rings 28 and 29 extend laterally outward and radially inward from the guide 14 with the ring 28 disposed near the outer periphery of the guide and with ring 29 disposed adjacent the inner periphery of the guide. These rubber rings form the sole connections between the rim and hub components of the wheel W and are stressed to carry the load borne by the wheel. They accommodate radial displacement of the hub and rim components by flexing movements of the rubber and since the rings are approximately two to five times longer than they are thick, they will have all lateral axes therethrough remaining linear under all operating conditions of the wheel. Each of the rings 28 and 29 provides a vertical column of elastic material of substantial cross-section across vertically extending chords at the "three-o'clock" and "nine-o'clock" positions of the wheel.

In order to balance stresses imposed by the rubber ring connections on the guide assembly 14 caused by the rings acting on an inner margin of the guide on one side and an outer margin of the guide on the other side and thereby tending to tilt the guide relative to the flange 3, the rings 28 and 29 are balanced to exert equal stresses by either varying the dimension ratios, the resilient properties, or both. When the rings 28 and 29 are of equal axial length, as shown, the thickness or radial width of the rings are varied in inverse proportion to their diameters so as to make the average bonding surfaces of both rings of equal area. Therefore, as shown, the small diameter ring 29 is considerably thicker than the large diameter ring 28 so that its bonding surfaces with the flange 11 and plate 31 will be equal in area to the larger diameter but thinner bonding surfaces of the ring 28 with the flange 5a and the plate 30.

As shown in Figures 3 and 4, bolts 34 connect the inner peripheral portions of the disks 15 and 16 of the guide assembly 14 and extend freely through large diameter holes 35 in the flange 3 of the wheel hub so as to allow for movement of the flange 3 in all directions relative to the guide. These bolts will act as stops to prevent over-stressing of the rubber rings 28 and 29 in the event of heavy braking action since the holes will limit the torsional forces applied to the rings. If the rings are destroyed, the transmission of driving or braking forces between the hub and rim parts can be maintained by these bolts. The bolts are disposed at predetermined intervals around the inner peripheral portion of the guide assembly 14.

As shown in Figures 2 and 3, a relatively large space S is provided inside the rim portion 23 between this rim portion and the ring 29 to accommodate a relatively large diameter brake drum 36 with heat-dissipating fins 37 radiating therefrom. The brake drum 36 can be affixed to the axle A in the same manner as the hub 1 to rotate with the wheel and axle.

In the modification shown in Figure 5, parts identical with parts described in Figures 1 to 4 have been marked with the same reference numerals.

As shown in Figure 5, rubber rings 40 and 41 are bonded directly to the guide disks 15 and 16 and the ring 40 is axially longer than the ring 41. The ring 41 is thinner than the corresponding ring 29 in Figure 3.

To accommodate the increased axial length of the ring 40, the disk 42, the flange 2 of the hub 1 is dished so that its outturned flange 43 is positioned a considerable distance outward from the disk 15.

The rings 40 and 41 are balanced so as to avoid stresses on the sliding guide and to avoid excessive axial and circumferential stresses.

The bolts such as 44 through the inner margins of the disks 15 and 16 are covered with a resilient coating 45, of rubber or rubber-like material to provide a shock-absorbing impact surface. If desired, as shown, this coating 45 can be on or substituted with a sleeve 46 rotatable on the bolt to provide a rotatable needle-like bearing.

From the above descriptions it will, therefore, be understood that this invention provides a wheel with a hub component slidably guiding a rim component and with the two components joined by elastic resilient rubber rings providing a spring. The rings are disposed on opposite sides of the sliding guide and one of the rings is considerably smaller than the other so that a full-sized brake and braking assembly can be interposed between the rim of the wheel and the small diameter ring. The resilient rings have an axial dimension greater than the radial thickness thereof to eliminate shear stresses in the resilient material. The rings are always linear and will not buckle or fold during radial displacement of the hub and rim components. A resilient bumper is provided on the hub to operate inside of the sliding guide and form a rubber cushioning bottom stop for relative radial displacement of the rim and hub components. Pins carried by the slide are provided to coact with the hub and forming stops to prevent over-stressing of the rubber rings in the event of strong braking or the like. In the event that the rubber rings are destroyed, these pins will provide a driving connecting between the rim and hub components so that transmission of forces therebetween will not be interrupted.

In order to balance the wheel and relieve stresses on the sliding guide, the rubber rings are proportioned. In the case of rubber rings of equal axial length, the thickness of the rings is inversely proportional to their diameters so as to make the bonding surface of both rings equal. Thus, if the rings have the same axial length and if their diameters are inversely proportional to their radial width, the circumferential forces are equal to the relation of the diameters while the torque moments are equal to the square of the relation of the diameters. On the other hand, if the radial widths of the rings are equal, the relation of the circumferential forces will equal the square of the relation of the diameters and the torque relation will equal the third power of the relation of the diameters. It is, therefore, desirable to vary the thicknesses or radial widths of the rings in inverse relation to the diameter of the rings. Of course, other variables are available for distributing the load on both rings including variation in the axial length of the rings to modify the springing qualities, variations in the types of rubber used in the different rings, and the like.

It will be understood that variations and modifications may be effected without departing from the scope of the novel concepts of this invention.

I claim as my invention:

1. In a spring wheel having a rim and a hub, two rubber annulus means extending obliquely between the rim and hub and anchored thereto at the inner and outer ends thereof, said annulus means having a substantially greater axial extend than radial extent and being constructed and arranged so that all lateral axes through the body thereof between the anchored portions remain linear under all operating conditions of the wheel, one of said rubber annulus means being of substantially smaller diameter than the other of said rubber annulus means, and said wheel having a space of appreciable radial extent between the rim and smaller diameter rubber annulus means adapted to receive a portion of a brake drum adapted to be air-cooled.

2. A spring wheel which comprises a hub, a rim, a sliding guide having radial slidable members carried respectively by said hub and rim to stabilize the hub and rim against lateral displacement, a small diameter rubber ring on one side of said guide, a large diameter rubber ring on the other side of said guide, said rings secured to said rim-connected member of said guide and extending obliquely outwardly from said guide and having an axial extent greater than the radial extent thereof, hub-carried parts attached to the outer ends of said rings, said rings resiliently suspending the hub in the rim, pins carried by one of the guide members, apertures in the other guide member having walls loosely surrounding said pins, said pins and apertures providing a connection between the rim and hub to transmit driving and braking forces in the event of failure of the rubber rings.

3. A vehicle wheel which comprises separate hub and rim components adapted to be radially and circumferentially displaced relative to each other, frusto-conical elastic rings connecting the components to spring suspend the hub from the rim, said rings extending in axially opposite directions and being related to the axis such that the included angle therebetween is a very acute angle, one of said rings being of substantially smaller diameter than the other of said rings, both of said rings being of substantially greater axial extent than radial extent, said smaller diameter ring being radially thicker than the other ring, said rings having the opposite ends thereof respectively connected to said rim and hub components through bonded connections across the radial thickness of the rings, and the bonded areas of both rings being substantially equal to balance stress between the rim and hub components.

4. A wheel which comprises a hub, a rim, means radiating from said hub and providing axially spaced first anchorages, means on said rim providing second anchorages each associated with a first anchorage in generally axially aligned, inwardly spaced, relationship thereto, a pair of opposed elastic sleeves each extending generally axially of the wheel and being related to the axis such that the included angle therebetween is a very acute angle, each sleeve having an axial outer end secured to a first anchorage and an axial inner end secured to a second anchorage, each sleeve having the shape of a surface of revolution in which the generatrix is a straight line and lies in the same plane as the axis of revolution and which shaped sleeve provides straight line connections between the anchorages which will not fold while accommodating radial and circumferential displacements of the hub and rim, each sleeve having its intermediate portion between said anchorages unsupported, the width of said intermediate portion in the axial direction being in the range of two to five times as great as its thickness in the radial direction, said sleeve forming a vertical column of elastic material of substantial cross-section across vertically extending chords at the "three-o'clock" and "nine-o'clock" position of the wheel, one of said elastic sleeves having a diameter substantially less than the internal diameter of said rim, and a brake drum having at least a portion thereof lying radially between said one sleeve and said rim.

5. A wheel which comprises a hub, a rim, means radiating from said hub and providing axially spaced first anchorages, means on said rim providing second anchorages each associated with a first anchorage in generally axially aligned, inwardly spaced, relationship thereto, a pair of opposed elastic sleeves each extending generally axially of the wheel and being related to the axis such that the included angle therebetween is a very acute angle, each sleeve having an axial outer end secured to a first anchorage, each sleeve having an axial inner end secured to a second anchorage, each sleeve having the shape of a surface of revolution in which the generatrix is a straight line and lies in the same plane as the axis of revolution and which shaped sleeve provides straight line connections between the anchorages which will not fold while accommodating radial and circumferential displacements of the hub and rim, each sleeve having its intermediate portion between said anchorages unsupported, the width of said intermediate portion in the axial direction being in the range of two to five times as great as its thickness in the radial direction, said sleeve forming a vertical column of elastic material of substantial cross-section across vertically extending chords at the "three-o'clock" and "nine-o'clock" positions of the wheel, one of said elastic sleeves having a substantially smaller diameter than the other of said elastic sleeves, and both of said sleeves being balanced to resist approximately equally the stresses exerted on said wheel during use, there being an annular space of appreciable radial extent radially between said rim and said sleeve of smaller diameter adapted to receive at least a portion of a brake drum therein.

References Cited in the file of this patent
UNITED STATES PATENTS

| | | |
|---|---|---|
| 1,115,566 | Picard | Nov. 2, 1914 |
| 1,398,738 | Putnam | Nov. 29, 1921 |
| 1,485,637 | Skrihoniuk | Mar. 4, 1924 |
| 1,605,257 | McKee | Nov. 2, 1926 |
| 2,463,226 | Walden | Mar. 1, 1949 |